United States Patent [19]

Suzuki et al.

[11] Patent Number: 4,529,352
[45] Date of Patent: Jul. 16, 1985

[54] CABLE SUPPORT OF A ROBOT

[75] Inventors: Takeo Suzuki; Yoshihiro Yurita; Hideharu Zenpo, all of Kitakyushu, Japan

[73] Assignee: Yaskawa Electric Mfg. Co. Ltd., Kitakyushu, Japan

[21] Appl. No.: 598,663

[22] Filed: Apr. 11, 1984

Related U.S. Application Data

[62] Division of Ser. No. 432,833, Oct. 5, 1982.

[30] Foreign Application Priority Data

Oct. 7, 1981 [JP] Japan .............................. 56-160756
Oct. 7, 1981 [JP] Japan .............................. 56-149885

[51] Int. Cl.³ .............................................. B25J 9/00
[52] U.S. Cl. .................................. 414/680; 414/918; 901/42; 248/49; 248/201
[58] Field of Search ................ 414/729, 918, 680; 137/343; 138/106, 113, 118; 248/49, 201, 80, 81; 901/41, 42

[56] References Cited

U.S. PATENT DOCUMENTS

| | | | |
|---|---|---|---|
| 2,596,133 | 5/1952 | Donahue et al. | 248/81 X |
| 3,543,989 | 12/1970 | Cooper | 901/41 X |
| 4,101,755 | 7/1978 | Uratani | 901/42 X |
| 4,139,142 | 2/1979 | Maple et al. | 248/49 X |
| 4,166,941 | 9/1979 | Cecil | 901/42 X |
| 4,175,600 | 11/1979 | Wallick | 141/363 |
| 4,249,062 | 2/1981 | Homumi et al. | 901/42 X |
| 4,283,617 | 8/1981 | Merrick et al. | 901/42 X |

FOREIGN PATENT DOCUMENTS

| | | | |
|---|---|---|---|
| 32729 | 8/1977 | Japan | 901/18 |
| 62676 | 5/1981 | Japan | 901/42 |

Primary Examiner—Leslie J. Paperner
Assistant Examiner—Terrance L. Siemens
Attorney, Agent, or Firm—James J. Ralabate

[57] ABSTRACT

The present invention discloses a cable support which can assure smooth operation of an industrial robot. The cable support is substantially characterized by having a movable support on one end of an operating arm and an auxiliary support on the wrist-side end of the arm respectively, wherein the movable support consists of a first rotary shaft rotatably mounted on the operating arm, a slanted resilient support arm having the proximal end thereof rotatably mounted on the first rotary shaft, and a cable holder tiltably mounted on a second rotary shaft mounted on the slanted resilient support arm and the auxiliary support consists of a third rotary shaft mounted on the operating arm and a cable clamp rotatably mounted on the second rotary shaft.

1 Claim, 3 Drawing Figures

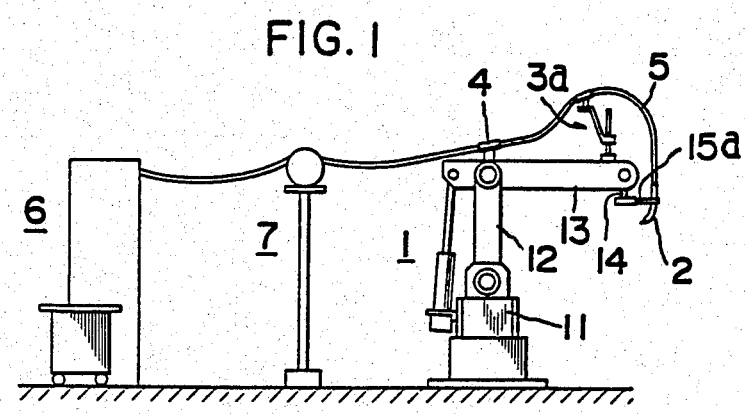
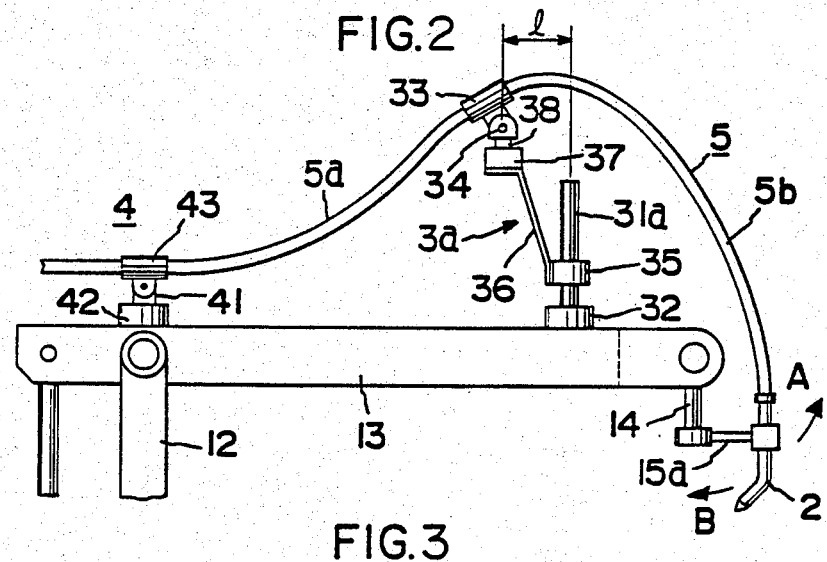
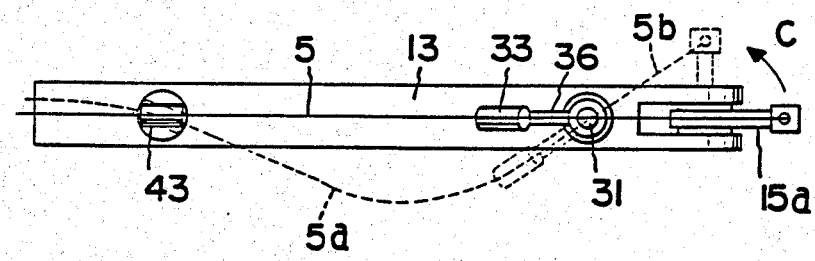

CABLE SUPPORT OF A ROBOT

This application is a divisional application of Ser. No. 06/432,833 filed Oct. 5, 1982 now pending.

BACKGROUND OF THE INVENTION

This invention relates to a support for a cable for supplying a welding wire, carbonate gas, or electric power to a working tool of an industrial robot, such as a welder.

In industrial robots, a working tool mounted on the extremity of an operating arm is operated in a three-dimensional locus by means of a plurality of operating arms. Various wires or cables are necessary for supplying power and operating signals from a controller to the working tool. Conventionally, these wires or cables are wound in a bundle in a suitable form, or are encased in a common cable or tube and clamped on the operating arm or are suspended from the operating arm or other support means.

These cables and tubes are made of flexible material. However, since they still have a certain degree of rigidity, a necessary slacking must be provided to these cables or wires to assure the movement of the working tool.

However, in a sophisticated robot which operates with high speed and precision, depending on the positioning of cables or tubes, the cable hampers a complicated movement of the operating arm. Furthermore, due to the tensioning or slack of the cable during the movement of the operating arm, a stress or an interference is exerted on the cable which ill-affects the operability of the arms and the working tool, thereby the operation with high precision cannot be achieved.

Accordingly, it is an object of the present invention to provide a cable support which assures the robot operation of high precision by eliminating the stress and the interference to the operating arms and the working tool, wherein the improvement is characterized in that a movable support is mounted on the operating arm at the wrist-side end thereof and an auxiliary support is mounted on the operating arm at the opposite end thereof to support the cable and that such supports can freely be rotated and tilted to readily follow the movement of the cable.

BRIEF EXPLANATION OF DRAWINGS

FIG. 1 is a side view of a robot provided with a cable support of the first embodiment of the present invention.

FIG. 2 is an enlarged side view of the cable support.

FIG. 3 is an enlarged plan view of the cable support.

DETAILED DESCRIPTION OF DISCLOSURE

The cable support of this invention is described hereinafter in conjunction with attached drawings.

Numeral 1 indicates a robot having the freedom of five degrees which comprises a turn base 11, a first tilt arm 12 which tilts in a forward and backward direction, a second tilt arm 13 which tilts in an upward direction and downward direction, a wrist arm 14 and a rotating arm 15a. A working tool 2 such as a welding torch is attached to the extremity of the rotating arm 15a. Numeral 3a indicates a movable support mounted on the upper face of the wrist-side end of the second tilt arm 13, numeral 4 indicates an auxiliary support mounted on the other side of the second tilt arm 13, for example, on the upper face of the arm 13 adjacent to a joint with the first tilt arm 12. Numeral 5 indicates a cable and numeral 6 indicates a welding controller. Numeral 7 indicates an intermediate cable support stand.

The movable support 3a comprises a first rotary shaft 31a which is rotatably mounted on the second tilt arm 13 by means of a bearing 32 at a position adjacent to a joint with the wrist arm 14. The height of this rotary shaft 31a is determined to be higher than the distance between the above joint and the shaft-mounting position.

A support block 35 is slidably mounted on the first rotary shaft 31a in place. A resilient support arm 36 such as a spring plate is disposed in a slanted position having the proximal end thereof fixedly mounted on the support block 35 and the distal end thereof provided with a bearing 37. A second rotary shaft 38 is rotatably mounted on the bearing 37 such that the axis thereof become parallel to the axis of the rotary shaft 31a.

The cable holder 33 is tiltably mounted on the upper end of the second rotary shaft 38 tiltably by means of the lateral pin 34.

The resilient support arm 36 of the movable support 3a is mounted on the rotary shaft 31a such that the height thereof is adjusted by the slide movement of the support block 35 so as to adjust the cable tension. However, if a means is specifically provided to absorb the slack of the cable, the support block 35 may be fixedly mounted on the rotary shaft 31a.

A third rotary shaft 41 which is lower than the first rotary shaft 31a is rotatably mounted on the second tilt arm 13 by means of a bearing 42 at a position adjacent to a joint with the first tilt arm 12. A cable clamp 43 is tiltably mounted on the upper end of the third rotary shaft 41 by means of a lateral pin 44.

A cable 5 which has one end connected to the welding controller 6 is overhung on the cable clamp 43 of the auxiliary support 3a with a slack necessary for absorbing the forward-and-backward tilting and the rotation of the robot. The extension of the cable 5 is led to the cable holder 33 of the movable support 3a with another slack subsequently the cable 5 is connected to the torch 2 with a slack necessary for the movement of the torch 2. Accordingly, the cable 5 is supported in a shape of crown making the cable supporting portion of the movable support 3a as a peak and providing slacks on the cable portions 5a and 5b which dispose at both sides of the peak.

Since the operation of the robot is conducted with a greater drive force as the joint is located remoter from the wrist arm provided with the working tool 2, the fluctuation of the cable 5 which occurs due to the operation of the turn base 11, the first tilt arm 13, and the second tilt arm 13 can be almost neglected.

Suppose that the wrist arm 14 is operated so as to move the torch 2 in a direction of either A or B as shown in FIG. 2, the cable holder 33 of the movable support 3a is tilted and rotated corresponding to the upward movement, pulling and swinging of the cable 5. Since the resilient support arm 36 of the movable support 3a is deflected in a direction of the movement of the cable 5, the vibration of the cable 5 caused by the variation of the slack of the cable 5 can be decreased and the operation of the torch 2 is conducted smoothly.

Furthermore, when the rotating arm 15a is operated so as to move the torch 2 to a dotted position, the cable 5 deflected in a slanted direction relative to the axis of the second tilt arm 13. Due to the rigidity of the cable 5, the axis of the cable holder 33 is changed along with the rotation of the second rotary shaft 38 to follow the direction of the movement of the cable 5. Then, cooperating with the effect of the cable clamp 43 of the auxiliary support 4, the cable portion 5a is deflected in a direction opposed to the direction of the torch 2 so as to absorb the stress. When the amount of the rotation of the rotating arm 15a increases, the deflection of the cable portion 5b is increased and the pressure exerted on the cable holder 33 is increased. According to this embodiment, however, since the resilient member support arm 36 is tilted to make the cable holder 33 disposed away from the axis of the rotary shaft 31a by a distance of "l", the above pressure pushes the cable holder 33 and rotates the cable holder 33 by way of the bearing 32. Therefore, the direction of the resilient force of the resilient support arm 36 is always aligned with the direction of the cable 5. Due to this resilient force, a stress is drastically decreased and the shock and the vibration of the cable 5 is effectively absorbed, thereby the operation of the torch becomes extremely smooth.

As has been described heretofore, according to this invention, the cable can readily and smoothly follow the rotation of the movable support, and the rotation and the tilting of the cable clamp and the cable holder, whereby the shock and the stress on the cable caused by the deflection and the vibration of the cable can be effectively absorbed and an undue load on the cable disposed at the wrist portion is eliminated. Accordingly, the smooth operation of the working tool is assured, the locus of the working tool is accurately maintained and furthermore the cable is firmly supported, and the interference caused by the swinging of the cable at the time of the movement of the operating arm is eliminated, thus realizing the improvement of the precision of the robot operation and the high speed operation.

What we claim is:

1. A cable support of a robot comprising
   (a) an operating arm provided with a wrist arm at one end thereof for supporting a working tool,
   (b) a movable support mounted on a wrist-side end of said operating arm, said movable support consisting of a first rotary shaft rotatably mounted on said operating arm, a resilient support arm having the proximal end thereof rotatably mounted on said first rotary shaft in a slanted position and a cable holder being mounted on the distal end of said resilient support arm by means of a second rotary shaft, said second rotary shaft having an axis thereof parallel to the axis of said first rotary shaft;
   (c) an auxiliary support mounted on other end of said operating arm, said auxiliary support consisting of a third rotary shaft rotatably mounted on said operating arm and a cable clamp mounted on said third rotary shaft at a height lower than a mounting position of said cable holder, and
   (d) a cable overhanging on said cable clamp and on said cable holder and connected to said working tool.

* * * * *